(12) United States Patent
Gerstlauer et al.

(10) Patent No.: US 7,312,467 B2
(45) Date of Patent: Dec. 25, 2007

(54) DEVICE AND METHOD FOR READING OUT X-RAY INFORMATION STORED IN A STORAGE PHOSPHOR LAYER

(75) Inventors: Bernd Gerstlauer, Munich (DE); Detlef Brautmeier, Unterschleißheim (DE); Rainer Nebosis, Munich (DE); Axel Kasper, Munich (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 125 days.

(21) Appl. No.: 11/169,115

(22) Filed: Jun. 28, 2005

(65) Prior Publication Data

US 2005/0285062 A1 Dec. 29, 2005

(30) Foreign Application Priority Data

Jun. 29, 2004 (EP) .................................. 04103050

(51) Int. Cl.
G03B 42/08 (2006.01)
(52) U.S. Cl. ...................... 250/586; 250/584; 250/585; 250/587; 250/591
(58) Field of Classification Search ............... 250/584, 250/585, 586, 591, 587
See application file for complete search history.

(56) References Cited

U.S. PATENT DOCUMENTS

| 4,484,073 | A | | 11/1984 | Ohara et al. | |
|---|---|---|---|---|---|
| 4,689,690 | A | * | 8/1987 | Aagano | 358/410 |
| 4,700,066 | A | * | 10/1987 | Horikawa | 250/234 |
| 4,943,871 | A | * | 7/1990 | Miyagawa | 358/496 |
| 4,967,073 | A | * | 10/1990 | Shuji et al. | 250/235 |
| 4,985,629 | A | * | 1/1991 | Horikawa | 250/585 |
| 5,109,297 | A | * | 4/1992 | Izumi | 359/216 |
| 5,231,575 | A | | 7/1993 | Nakajima | |
| 5,373,154 | A | * | 12/1994 | Chen | 250/235 |
| 5,881,162 | A | * | 3/1999 | Ishimitsu | 382/132 |
| 5,898,184 | A | | 4/1999 | Stahl et al. | |
| 6,204,495 | B1 | | 3/2001 | Iwabuchi | |

\* cited by examiner

Primary Examiner—David Porta
Assistant Examiner—Shun Lee
(74) Attorney, Agent, or Firm—Houston Eliseeva LLP

(57) ABSTRACT

An apparatus and associated method for reading out X-ray information of an X-ray picture stored in a phosphor layer includes: an irradiation device for irradiating the phosphor layer with a stimulating light beam to be moved along a line over the phosphor layer, and in so doing stimulating the phosphor layer into emitting emission light; a detector for collecting the emission light emitted from the storage phosphor layer and for converting the emission light collected into a detector signal S; a processing unit for deducing picture signal values B for pixels of the picture along the line from the detector signal S; and two or more sensors located at different reference positions to collect reference times when the light beam is located at the different reference positions. The processing unit deduces a number of detector signal values D from the detector signal S to deduce the picture signal values B between the two reference times.

21 Claims, 2 Drawing Sheets

DEVICE AND METHOD FOR READING OUT X-RAY INFORMATION STORED IN A STORAGE PHOSPHOR LAYER

BACKGROUND OF THE INVENTION

The invention relates generally to a device and to a corresponding method for reading out X-ray information stored in a storage phosphor layer.

X-ray pictures can be stored in so-called storage phosphors, whereby the X-ray radiation passing through an object, for example a patient, is stored as a latent picture in a storage phosphor layer. In order to read out the latent picture, the storage phosphor layer is irradiated with stimulation light, and so stimulated into emitting emission light. The emission light, the intensity of which corresponds to the picture stored in the storage phosphor layer, is collected by an optical detector and converted into electric signals. The electric signals are further processed, as required, and finally made available for examination, in particular for medical diagnostic purposes, whereby they are displayed in a corresponding display unit, such as a monitor or a printer.

In U.S. Pat. No. 4,484,073, herein incorporated by reference in its entirety for background information only, a device and a method are described whereby a laser beam is deflected by means of a galvanometer mirror in such a way that the laser beam hits the storage phosphor layer to be read out essentially in the form of a dot, and passes over said storage phosphor layer in a linear area. The emission light emitted here by the storage phosphor layer is collected by a photomultiplier and converted into an electric signal. By conveying the storage phosphor layer perpendicularly to the linear area, individual linear areas of the storage phosphor layer can be successively read out so that finally, a two-dimensional X-ray picture is obtained which is made up from individual lines which are, in turn, respectively made up from a number of individual pixels. In order to convert the electric signal of the photomultiplier into individual picture signals allocated to the respective pixels of the X-ray picture, a position reference pulse is created for each pixel of a line by means of a so-called linear encoder, and the electric signal of the photomultiplier is integrated respectively in accordance with a position reference pulse over a fixed time interval. The signal value obtained with the respective integration is allocated to the corresponding pixel.

Because the speed of the deflection element is generally subject to fluctuations, the speed of the laser beam is not constant over the whole line to be read out, i.e., within the predetermined fixed time interval, the laser beam passes over areas of the storage phosphor layer which are of different widths in accordance with a position reference pulse depending upon the speed at that moment. This means that, with the described integration of the electric signal from the photomultiplier, areas of different widths are generally collected. A high momentary speed of the laser beam thus means that a relatively wide section of the area corresponding to a pixel is scanned by the laser beam in the pre-specified time interval. On the other hand, a low momentary speed leads to collection of a relatively narrow section of the area of the line allotted to a pixel. Overall, a partial loss of information and so a negative effect upon the picture quality of the X-ray picture read out must therefore be accepted.

It is the aim of the invention to provide a device and a corresponding method for reading out X-ray information stored in a storage phosphor layer with which the picture quality is improved, in particular with a reduction of information loss.

SUMMARY OF THE INVENTION

The above and other problems are solved by an apparatus and associated method for reading out X-ray information of an X-ray picture stored in a phosphor layer. The apparatus includes: an irradiation device for irradiating the phosphor layer with a stimulating light beam to be moved along a line over the phosphor layer, and in so doing stimulating the phosphor layer into emitting emission light; a detector for collecting the emission light emitted from the storage phosphor layer and for converting the emission light collected into a detector signal S; a processing unit for deducing picture signal values B for pixels of the picture along the line from the detector signal S; and two or more sensors located at different reference positions to collect reference times when the light beam is located at the different reference positions. The processing unit deduces a number of detector signal values D from the detector signal S to deduce the picture signal values B between the two reference times.

The invention is based upon the idea of using two or more sensors to collect the times when the stimulation light beam is at two or more reference positions, and to allocate the detector signal values deduced from the detector signal between the collected times to the individual pixels of the X-ray picture lying between the respective reference positions. From the generally several detector signal values respectively allocated to one pixel, a picture signal value which belongs to the respective pixel is calculated. In comparison with the methods established by the prior art, with the deduction of individual picture signal values in accordance with the invention, a larger portion of the information collected when scanning the line is taken into consideration.

By means of the device and the method in accordance with the invention, information losses are therefore reduced in comparison with the devices and methods established by the prior art. Moreover, displacement of individual lines of the X-ray picture to be read out relative to one another which can arise from statistical or systematic synchronism fluctuations of the stimulation light beam are reduced in a simple and reliable way. The device and the corresponding method in accordance with the invention thus make it possible to increase the picture quality, while at the same time reducing information loss.

In a first embodiment of the invention, it is proposed to position a first sensor such that a first reference time can be collected prior to movement of the stimulation light beam along the line, and to position a second sensor such that a second reference time can be collected after movement of the stimulation light beam along the line. This represents a design of the device and the corresponding method in accordance with the invention which is particularly easy to put into practice.

Preferably, the first sensor here is positioned in the area of a start and the second sensor in the area of an end of the line of the storage phosphor layer to be read out, preferably respectively directly next to the storage phosphor layer. The stimulation light beam then hits the first or the second sensor directly before and directly after the scanning of the line to be read out.

The first and/or second sensor here can also be positioned such that the stimulation light beam hits the first or second sensor respectively at a specific period of time prior to or after movement along the line. The reference times can then be calculated easily by adding or subtracting the respective period of time to the time collected with the first sensor or from the period of time collected with the second sensor. With this embodiment, the two sensors do not need to be positioned directly next to the storage phosphor layer, but they can be positioned independently of the remaining available space in the device. In particular, the two sensors must not be positioned on the level of the storage phosphor layer.

A further embodiment of the invention proposes that, alternatively to or in addition to the first and second sensor, several sensors are positioned along a sensor line and several reference times can be collected during movement of the stimulation light beam along the sensor line, and the processing unit is designed to deduce picture signal values from the detector signal values deduced between the reference times respectively. In this way, a particularly accurate and reliable avoidance of picture errors is guaranteed.

Preferably, the reference times in this embodiment are already collected and stored before the actual read-out of the storage phosphor layer, and are only used at the subsequent read-out of the storage phosphor layer in order to deduce the individual picture signal values from the detector signal values. The reference times collected here reflect the characteristic speed fluctuations of the deflection element and the laser beam while the same is moved over the line. By taking the reference times into consideration when deducing the individual picture signal values from the detector signal values, any picture errors arising from fluctuations in speed of the deflection element and the laser beam can be reduced.

Preferably, the sensor line is positioned at the point at which the storage phosphor layer is located for read-out. After collecting the reference times, which preferably takes place shortly before read-out of the storage phosphor layer, the sensor line is removed and the storage phosphor layer to be read out can then be conveyed past the linearly moved laser beam for read-out.

In another preferred embodiment of the invention, it is proposed that the sensors are respectively provided with a slit aperture through which at least part of the stimulation light beam can pass and hit the respective sensor. The slit apertures make it possible to collect the individual reference times with a particularly high level of accuracy.

Preferably, a conductor board is provided onto which the sensors are attached, and which incorporates the respective slit apertures. In this way, a simple and compact structure is achieved.

In another preferred embodiment of this variation, the conductor board for the light of the stimulation light beam is at least partially permeable. With this embodiment, the individual slit apertures are preferably located on the side of the conductor board facing the stimulation light beam. Alternatively, however, the slit apertures can also be located on the side of the conductor board facing away from the stimulation light beam. The slit apertures preferably consist of a material which is essentially impermeable to the light of the stimulation light beam, such as metal for example.

In the area of the individual slit apertures on the side of the conductor board facing away from the stimulation light beam, the sensors, in particular photo diodes are located, and these can collect at least part of the stimulation light beam passing through the individual slit apertures and the conductor board. The sensors here are preferably designed in such a way that their respective light-sensitive surface is facing the conductor board. This embodiment of the invention makes it possible, with a simple and compact structure, to determine the reference positions with great precision by means of a corresponding arrangement of the slit apertures on the side of the conductor board facing the light beam. This is preferably achieved by means of a corresponding arrangement of a conductor board coated with a metal layer on both sides.

In a preferred embodiment of the method in accordance with the invention it is proposed that the picture signal values are respectively deduced by forming a, in particular, arithmetical average value from several detector signal values. The formation of an average value is a simple, efficient and particularly reliable calculation method for the picture signal values from the respective detector signal values. By forming the arithmetical average value, a high level of picture quality is achieved.

Furthermore, it is preferred that the number of detector signal values from which a picture signal value can respectively be deduced is determined by the reference times collected. A very sharp picture can be produced, in particular in association with a subsequent average value calculation In order to produce a particularly sharp picture with the least possible amount of picture noise, the detector signal is sampled with a sampling rate which corresponds to a whole number multiplication N of the reciprocal value of an average period of time $\Delta t$ which the stimulation light beam requires in the medium of time average for the movement over a pixel of the X-ray picture along the line: $f = N/\Delta t$.

Further features and advantages of the invention are given in the following description of preferred embodiments and applications given as examples, whereby reference is made to the attached drawings.

DETAILED DESCRIPTION OF THE PREFERRED EMBODIMENTS

Figure 1:
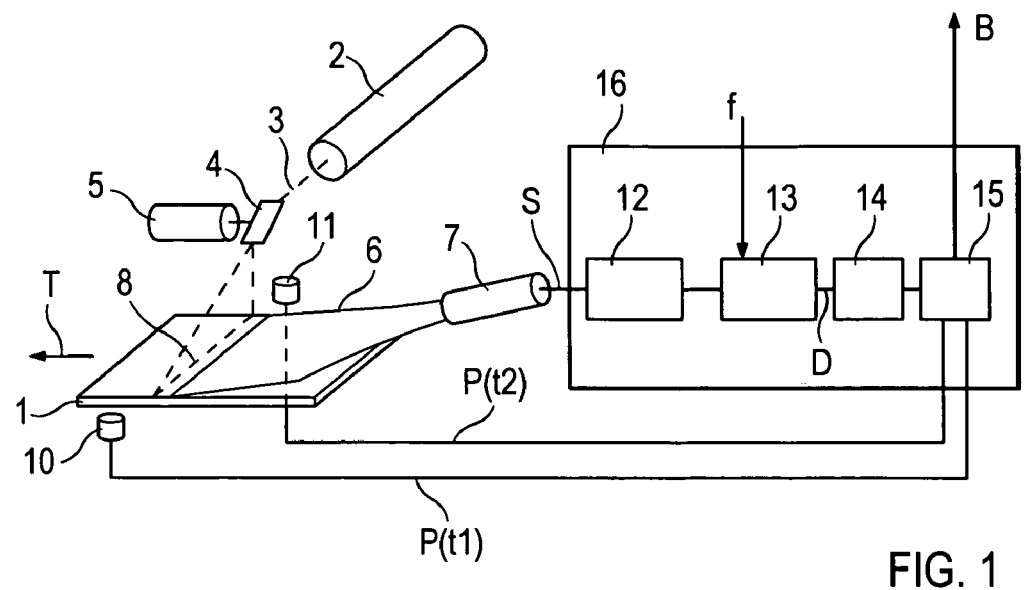
FIG. 1 shows a device in accordance with a first embodiment of the principles of the invention for reading out from a storage phosphor layer.

FIG. 1 shows a device for reading out from a storage phosphor layer 1. By means of a laser 2 a stimulation light beam 3 is produced which is deflected by a deflection element 4 moved in rotation by a motor 5 in such a way that said stimulation light beam moves along a line 8 over the storage phosphor layer 1 to be read out. The storage phosphor layer 1 now emits emission light dependent upon the X-ray information stored in it, and said emission light is gathered by an optical gathering device 6, for example a light conductor bundle, and collected by an optical detector 7, preferably a photomultiplier, and thus converted into a corresponding detector signal S. The deflector element 4 is preferably in the form of a mirror, such as a polygon mirror or a galvanometer mirror.

The detector signal S is conveyed to a processing unit 16 wherein picture signal values B are deduced for individual pixels of the X-ray picture being read out. If the line 8 read out is made up, for example, from 1000 pixels, 1000 corresponding picture signal values B are deduced from the detector signal S obtained when reading out the line 8.

By conveying the storage phosphor layer 1 in conveyance direction T, it is possible to read out individual lines 8 successively, and so obtain a two-dimensional X-ray picture consisting of individual pixels, respectively with a corresponding picture signal value B. If the number of lines 8 read out in conveyance direction T is for example 1500, with 1000 pixels respectively per line, at total of 1500×1000 pixels respectively with a corresponding picture signal value B are obtained for the X-ray picture read out.

Figure 2:
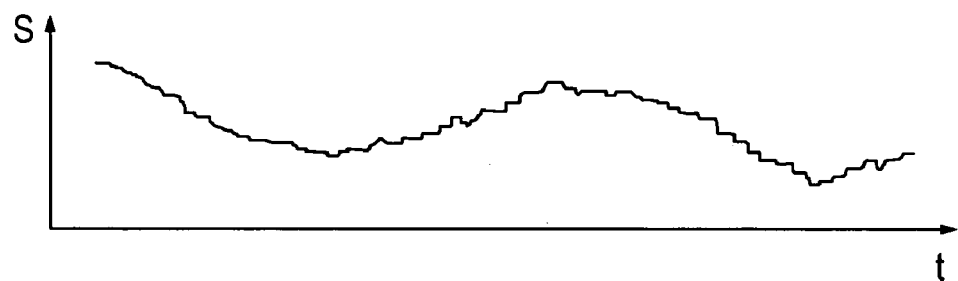
FIG. 2 shows a detector signal sequence.

FIG. 2 shows an example of a sequence of the detector signal S produced in the device in accordance with FIG. 1. In the following, the deduction of picture signal values B from the detector signal S is described in greater detail.

The detector signal S is first of all (see FIG. 1) filtered through a low-pass filter 12, whereby higher frequency portions of the detector signal S, in particular noise portions, are eliminated. The filtered detector signal S is then fed into an analogue to digital converter 13, and there it is sampled with a sampling rate f, whereby with each sampling process, a detector signal value D is obtained in respective digital units. The sampling of the detector signal S in the analogue to digital converter 13 is preferably carried out in accordance with the so-called Sample and Hold principle, according to which, when sampling, the respective current analogue signal height of the detector signal S given at a sampling time on the analogue to digital converter 13 is held and converted into a corresponding digital detector signal value D. After storage in the storage unit 14, the picture signal values B are calculated from the detector signal values D in a calculation unit 15.

The low-pass filter 12 is preferably designed in such a way that it can be used to eliminate portions of the detector signal S which have a frequency $f_g$ which is greater than half the sampling frequency f: $f_g > 0.5 \cdot f$. In this way, any picture artefacts created by the sampling of high-frequency detector signal portions are avoided, and so the picture quality is further improved.

Figure 3:
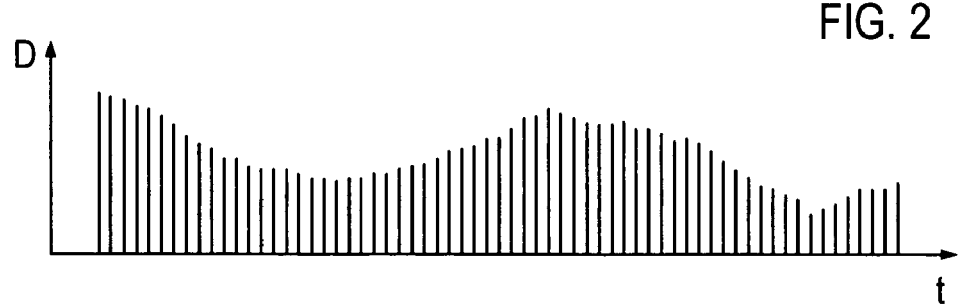
FIG. 3 shows detector signal values deduced from the detector signal.

FIG. 3 shows a number of detector signal values D deduced from the detector signal S shown in FIG. 2 over the time t. The distance in time between the individual detector signal values D is determined by the sampling rate f of the analogue to digital converter 13. A specific point of the stimulation light beam 3 on the line 8 of the storage phosphor layer 1 corresponds here to each time.

The sampling rate f is chosen such that, for every individual pixel along the line 8, at least two detector signal values B are obtained from which a picture signal value belonging respectively to a pixel can then be calculated. For simplification and for better clarification, it is presumed in this example that the line 8 being read out only consists of 13 pixels. The sampling rate f in this example is chosen such that five detector signal values D are obtained respectively for each of the 13 pixels.

Figure 4:
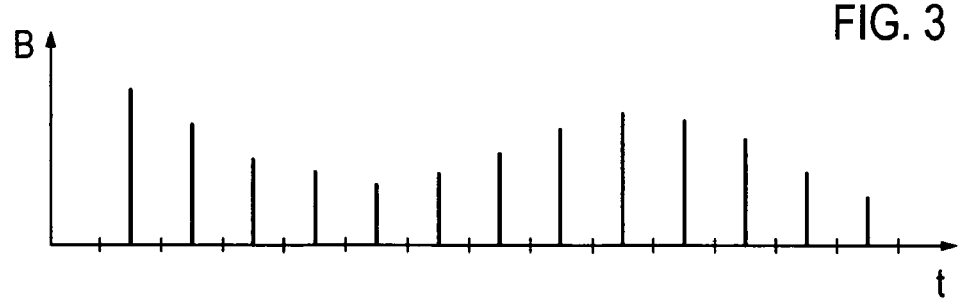
FIG. 4 shows an example for picture signal values deduced from the detector signal values.

The picture signal values B correspondingly deduced for this example are shown in FIG. 4 whereby a picture signal value B was calculated respectively from five of the detector signal values D shown in FIG. 3, whereby the arithmetical average value was respectively determined from the individual detector signal values D.

In this example, the sampling rate f is five times the reciprocal value of an average period of time $\Delta t$ which the stimulation light beam 3 requires in the medium of time for movement over a pixel of the X-ray picture along the line 8. The following example should make this clear: If the average period of time $\Delta t$ for the movement of the stimulation light beam 3 over a pixel of the X-ray picture is on average one microsecond (1 μs), the sampling rate f will be $5/\Delta 5 = 5/1\mu s = 5$ MHZ.

It is also advantageous to calculate the picture signal value B of a pixel from the respective detector signal values D directly following deduction of these detector signal values D from the detector signal S. The individual picture signal values B for the line 8 are therefore determined parallel in time or simultaneously with the sampling of the line 8. The calculation of an individual pixel always takes place directly following the deduction of the two or more detector signal values D from detector signal S required for the calculation of the respective picture signal values B. In this way, only the detector signal values D to be respectively summarised as a picture signal B need be stored in the storage unit 14 of the processing unit 16 before they are further processed in the calculation unit 15. The storage requirement in the storage unit 14 is thus low. Moreover, due to the simultaneous processing of the detector signal values D during the read-out of the line 8, subsequent processing of the detector signal values D can be dispensed with after the read-out of the line 8 is over.

The repeated sampling of the detector signal S for each individual pixel, which can also be called 'oversampling', and the deduction of a corresponding picture signal value for every pixel of the line 8 respectively from several detector signal values leads overall to a reduction of the noise which superimposes the detector signal S and so to improved picture quality with, at the same time, less information loss in comparison with the devices and methods established by the prior art.

The signal processing of the detector signal S described in greater detail in connection with FIGS. 2 to 4 is particularly appropriate for scanners with good synchronism properties, whereby the stimulation light beam 3 is moved over the respective line 8 of the storage phosphor layer 1 to be read out at a speed which is essentially constant. This is generally achieved by means of optically high-value deflection elements 4, in particular a galvanometer or polygon mirror, in connection with a motor 5 with good synchronism properties.

In order to further improve the picture quality of the X-ray pictures read out with this type of scanner, or in the case of cheaper scanners with less good optical elements or synchronism properties still to achieve a high level of picture quality, the processing of the detector signal S described in more detail below is preferably carried out.

With a first embodiment of this method, the corresponding device (see FIG. 1) has two sensors 10 and 11 which are positioned in the area of the start and the end of the line 8, along which the stimulation light beam moves 3.

If the stimulation light beam 3 is deflected by the deflection element 4 in the direction of the line 8, this passes the first sensor 10 before scanning the line 8 and the second sensor 11 after scanning the line 8. In so doing, the light from the stimulation light beam 3 is collected by the two light-sensitive sensors 10 and 11, and converted into electric impulses P(t1) and P(t2) corresponding to the reference times t1 and t2 and conveyed on to a calculation unit 15 of the processing unit 16.

The detector signal S obtained during the movement of the stimulation light beam 3 over the line 8 of the storage phosphor layer 1, as already described in detail, is filtered through a low-pass filter 12 and sampled in an analogue to digital converter 13 with a sampling rate f, whereby a number of detector signal values D are obtained. The detector signal values D are stored in a storage unit 14.

The calculation unit 15 engages onto the detector signal values D stored in the storage unit 14 and deduces from these individual picture signal values B. With this embodiment of the signal processing, the deduction of the picture signal values B, in particular the allocation of individual detector signal values D respectively to one pixel and the calculation of the picture signal value from the allocated detector signal values D takes place dependent upon the reference times t1 and t2.

Figure 5A:
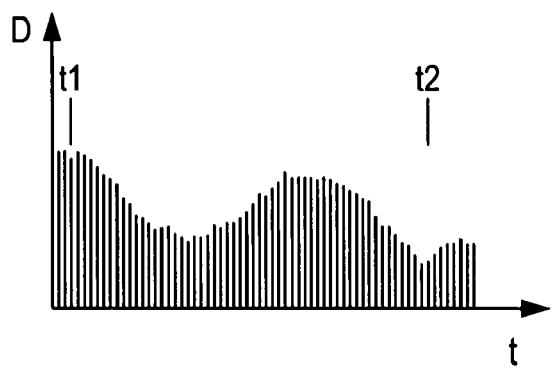
FIGS. 5*a* and 5*b* show further examples for picture signal values deduced from detector signal values.

FIG. 5a shows a first example of detector signal values D over the time t which were deduced from the detector signal S for a line 8. The diagram shows not only the detector signal values D, but also the two reference times t1 and t2 at which the stimulation light beam 3 passes the two sensors 10 and 11. The detector signal values D relevant for deducing picture signal values B for the individual pixels of the X-ray picture along the line 8 lie between the two reference times t1 and t2. Correspondingly, only these detector signal values D are used for the deduction of the individual picture signal values B.

Figure 5B:
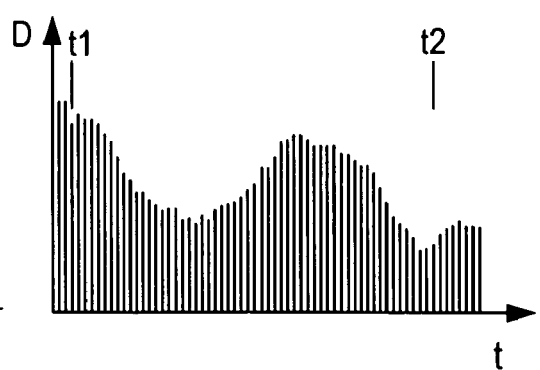

In a further read-out process, the detector signal values D for a further line 8 shown as an example in FIG. 5b are determined. Contrary to the example shown in FIG. 5a, the second reference time t2 is only reached at a later time. This is attributable to synchronism fluctuations of the stimulation light beam 3 while the same moves along the line 8. Observed in the medium of time, the stimulation light beam 3 passes over the line 8 to be read out here at a speed which is lower than in the example shown in FIG. 5a.

This effect is compensated in accordance with the invention in that the detector signal values D collected respectively between the two reference times t1 and t2 are distributed over the pre-specified number of individual pixels. If a line 8 of the X-ray picture read out includes, for example, 1000 pixels, and if in the example shown in FIG. 5a 5000 detector signal values D are deduced between the two reference times t1 and t2, five detector signal values are respectively allocated to each individual pixel and a picture signal value calculated from the respectively allocated detector signal values, in particular by means of forming an average value.

For the example shown in FIG. 5b, it is presumed that a total of 5100 detector signal values D are obtained between the two reference times t1 and t2. These are now also distributed over the 1000 pre-specified pixels. If it is presumed, for example, that the synchronism fluctuations of the stimulation light beam are distributed essentially evenly over the whole period of time between the two reference times t1 and t2, on average 5.1 detector signal values D are allocated to each pixel and a corresponding picture signal value deduced from this by forming an average value.

This average value formation can, for example, be arrived at from a corresponding weighting of portions of the detector signal values D which are not whole numbers. For example, when forming this average value for the first picture signal value in the specified example from FIG. 5b, five detector signal values would respectively be weighted at 100%, and the subsequent sixth detector signal value at just 10%.

Alternatively, individual detector signal values can always be allocated in their entirety to individual pixels. In the example given in FIG. 5b it would be, for example, conceivable always to allocate five detector signal values D respectively to nine adjacent pixels and to allocate six detector signal values to the respective subsequent tenth pixel. All further allocations of detector signal values D to pixels then happen correspondingly.

With these calculation methods, it is presumed that speed fluctuations of the stimulation light beam 3 will be statistically evenly distributed while the same moves over the line 8. In this way, picture errors arising from synchronism fluctuations of the stimulation light beam, such as so-called 'jitter effects' can be reduced easily and reliably.

A method for further improving the picture quality proposes that the behaviour over time of the movement of the stimulation light beam along a line be collected, and that this be taken into account when deducing picture signal values B from the individual detector signal values D.

Figure 6:
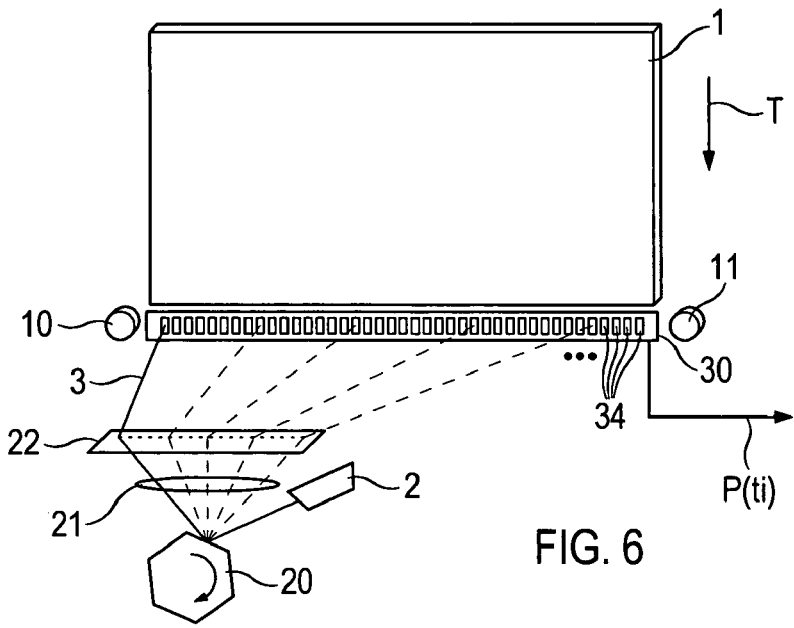
FIG. 6 shows another embodiment of a device in accordance with the principles of the invention for reading out from a storage phosphor layer.

In FIG. 6 a preferred embodiment of a corresponding device for putting this method into practice is shown. The stimulation light beam 3 produced by a laser 2 is deflected by a rotating polygon mirror 20, and hits a sensor line 30 after having passed through an appropriate optical system which, in the example shown, consists of a lens 21 and a cylinder mirror 22. The sensor line 30 has a number of light-sensitive sensors 34 spaced at regular intervals. While the stimulation light beam 3 is moved along the sensor 30 line, it successively passes over the individual sensors 34. In this way a pulse P(ti) is produced respectively at a reference time ti, and said pulse is conveyed on to a processing unit (not shown).

The sensor line 30 can be positioned on the level of the storage phosphor layer 1, but alternatively also at a small distance in front of or behind the level of the storage phosphor layer 1.

Preferably, in this way a number of reference times ti are collected during at least a full 360° rotation of the polygon mirror before the actual read-out of the storage phosphor layer 1, and these are stored in the processing unit. The sensor line 30 can then be moved out of the course of the beam, e.g. by means of an appropriate mechanical rotation device (not shown). If the sensor line 30 is positioned at a small distance behind the storage phosphor layer 1, it can remain in its position, and is concealed by the same during read-out of the storage phosphor layer 1.

The actual read-out process of the storage phosphor layer 1 can now begin, wherein the same is moved along the conveyance device T along the course of the beam. If, as already explained in connection with FIGS. 1, 5a and 5b, a first and second reference time t1 and t2 are collected by means of the two sensors 10 and 11, the allocation of the detector signal values D obtained between the two reference times t1 and t2 to individual pixels, at the same time taking into account the previously collected reference times ti, can take place. The corresponding picture signal values B are then deduced from the allocated detector signal values D.

For the allocation of detector signal values D deduced from between two reference times tn and tn+1 respectively to the individual pixels which lie between the nth and (n+1)th reference position, the embodiments of the methods described in connection with FIGS. 5a and 5b apply here correspondingly.

Figure 7:
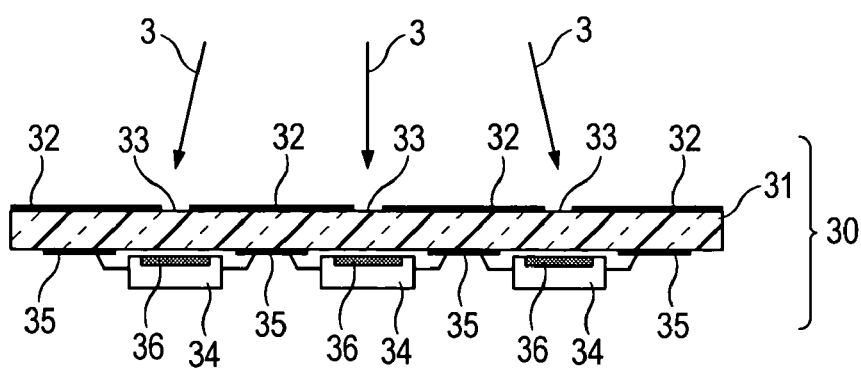
FIG. 7 shows a cross-section through a sensor line shown in FIG. 6.

FIG. 7 shows a cross-section (section) through the sensor line 30 shown in FIG. 6. The sensor line 30 includes a conductor board 31 which consists of synthetic resin reinforced with glass fibres, and is at least partially transparent for the light of the stimulation light beam 3.

On the side of the conductor board 31 facing the stimulation light beam 3, individual slit apertures 33 are created by masking a metallic layer 32 located on this and which is preferably made from copper.

In the area of the slit apertures 33 on the opposite side of the conductor board 31 the sensors 34, in particular in the form of photo diodes, are attached, and these have a light-sensitive layer 36 on the side facing the conductor board 31. The sensors 34 are connected to conductor paths 35 located on the conductor board 31, and are correspondingly connected, for example with parallel connection. Photo diodes of the SMD design, such as of the type BPW34 Reverse Gullwing made by the company Osram® are particularly suitable as sensors 34.

By means of this embodiment of the sensor line 30, it is possible to provide particularly simple, compact and reliable collection of the reference times ti along the sensor line 30. In this way, a particular high level of picture quality is achieved with the deduction of picture signal values B from the detector signal values D described above.

The invention claimed is:

1. An apparatus for reading out X-ray information stored in a storage phosphor layer, whereby an X-ray picture made up from a number of pixels is obtained, the apparatus comprising:
an irradiation device for irradiating the storage phosphor layer with a stimulation light beam to be moved along a line over the storage phosphor layer, and in so doing stimulating the storage phosphor layer into emitting emission light;
a detector for collecting the emission light emitted from the storage phosphor layer and for converting the emission light collected into a corresponding detector signal S; and
a processing unit for deducing picture signal values B for the pixels of the X-ray picture along the line from the detector signal S; and
at least two sensors located at different reference positions, each sensor collecting a reference time when the stimulation light beam is located at said sensor's respective reference position, and
wherein the processing unit deduces a number of detector signal values D from the detector signal S with the number of signal values D being dependent on an uncontrolled scanning speed, and the processing unit further deducing the picture signal values B from detector signal values D deduced between the reference time from respectively two of said at least two sensors.

2. The apparatus in accordance with claim 1, wherein a first of said at least two sensors is positioned such that a first said reference time is collected before the stimulation light beam is moved along the line, and a second of said at least two sensors is positioned such that a second said reference time is collected after the stimulation light beam has moved along the line.

3. The apparatus in accordance with claim 2, wherein the said first sensor is located in a start area of the line and said second sensor is located in an end area of the line.

4. The apparatus in accordance with claim 2, wherein either the first or the second sensor is positioned such that the stimulation light beam hits the respective first or the second sensor at a specific period of time before or after movement of the light beam along the line.

5. The apparatus in accordance with claim 1, further comprising:
said at least two sensors is more than two sensors, wherein said more than two sensors are positioned along a sensor line, each collecting reference times during movement of the stimulation light beam along the sensor line, and
the processing unit deducing picture signal values B from the detector signal values D deduced between the reference time from respectively two of said more than two sensors.

6. The apparatus in accordance with claim 5, further characterized in that the more than two of sensors are respectively each provided with a slit aperture through which at least part of the stimulation light beam passes and be collected by the respective sensor.

7. The apparatus in accordance with claim 6, further comprising a conductor board onto which the more than two of sensors are attached, and which incorporates the respective said slit apertures.

8. The apparatus in accordance with claim 7, wherein the conductor board is at least partially permeable to the light of the stimulation light beam and the individual slit apertures are located on a side of the conductor board facing the stimulation light beam.

9. The apparatus in accordance with claim 8, wherein the slit apertures are provided through a material which is essentially impermeable to the light of the stimulation light beam.

10. The apparatus in accordance with claim 9, wherein the material is metal.

11. The apparatus in accordance with claim 7, wherein the more than two of sensors are positioned on a side of the conductor board facing away from the stimulation light beam in an area of individual slit apertures.

12. The apparatus in accordance with claim 11, further characterized in that the more than two of sensors each have a light-sensitive surface facing the conductor board.

13. The apparatus in accordance with claim 11, wherein at least one of the more than two of sensors is a photo diode.

14. The apparatus in accordance with claim 1, wherein the uncontrolled scanning speed is not controlled insofar as the number of detector signal values D varies from line to line depending on the scanning speed for the corresponding line.

15. A method for reading out X-ray information stored in a storage phosphor layer, whereby an X-ray picture made up from a number of pixels is obtained, comprising the steps of:
irradiating the storage phosphor layer with a stimulation light beam moved along a line over the storage phosphor layer and stimulating the storage phosphor layer into emitting emission light;
collecting the emission light emitted from the storage phosphor layer and converting the emission light collected into a corresponding detector signal S;
deducing picture signal values B for the pixels of the X-ray picture along the line from the detector signal S;
collecting at least two reference times when the stimulation light beam is located at two different reference positions,
deducing a number of detector signal values D from the detector signal S, said number being dependent on an uncontrolled scanning speed, and
deducing picture signal values B from the detector signal values D deduced from between two of said at least two reference times respectively.

16. The method in accordance with claim 15, further comprising collecting a first of said at least two reference times prior to movement of the stimulation light beam along the line of the storage phosphor layer, and collecting a second of said at least two reference times after movement of the stimulation light beam along the line of the storage phosphor layer.

17. The method in accordance with claim 15, further comprising:
prior to a read-out of the storage phosphor layer, collecting and storing said at least two reference times, and
during the read-out of the storage phosphor layer, deducing the picture signal values B from the detector signal values D deduced between two of said at least two reference times respectively.

18. The method in accordance with claim 15, further comprising deducing the picture signal values B respectively by forming a, in particular arithmetical, average value from the detector signal values D.

19. The method in accordance with claim 15, further comprising deducing a number of detector signal values D from which a particular picture signal value B respectively is determined by using said at least two reference times.

20. The method in accordance with claim 15, further comprising deducing the detector signal values D by sampling the detector signal S with a sampling rate f which is a multiple N of a reciprocal value of an average period of time $\Delta t$ which the stimulation light beam requires for the movement of the stimulation light beam over a pixel along the line: $f=N/\Delta t$, whereby N is a whole number and greater than 1.

21. The method in accordance with claim 15, wherein the uncontrolled scanning speed is not controlled insofar as the number of detector signal values D varies from line to line depending on the scanning speed for the corresponding line.

* * * * *